United States Patent
Yazaki

(10) Patent No.: US 10,324,502 B2
(45) Date of Patent: Jun. 18, 2019

(54) SPEAKER MODULE AND ELECTRONIC APPARATUS

(71) Applicant: Murata Manufacturing Co., Ltd., Nagaokakyo-shi, Kyoto-fu (JP)

(72) Inventor: Hirokazu Yazaki, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 22 days.

(21) Appl. No.: 15/861,708

(22) Filed: Jan. 4, 2018

(65) Prior Publication Data

US 2019/0011959 A1   Jan. 10, 2019

Related U.S. Application Data

(63) Continuation of application No. PCT/JP2016/070944, filed on Jul. 15, 2016.

(30) Foreign Application Priority Data

Jul. 27, 2015   (JP) .................. 2015-148131

(51) Int. Cl.
| | |
|---|---|
| *G06F 1/16* | (2006.01) |
| *H04M 1/02* | (2006.01) |
| *H04R 1/00* | (2006.01) |
| *H04R 1/02* | (2006.01) |
| *H04R 9/02* | (2006.01) |

(Continued)

(52) U.S. Cl.
CPC ...... *G06F 1/1688* (2013.01); *H02M 3/33569* (2013.01); *H04M 1/02* (2013.01); *H04R 1/00* (2013.01); *H04R 1/02* (2013.01); *H04R 1/025* (2013.01); *H04R 9/025* (2013.01); *H04R 9/06* (2013.01)

(58) Field of Classification Search
None
See application file for complete search history.

(56) References Cited

U.S. PATENT DOCUMENTS 6,181,579 B1 *  1/2001  Nagai ............... H02M 3/33592
                                                363/21.06
2003/0059079 A1   3/2003  Asahina et al.
2006/0227518 A1  10/2006  Nishio et al.
(Continued)

FOREIGN PATENT DOCUMENTS

JP   2003-102093 A   4/2003
JP   2004-072815 A   3/2004
(Continued)

OTHER PUBLICATIONS

Official Communication issued in International Patent Application No. PCT/JP2016/070944, dated Oct. 4, 2016.

*Primary Examiner* — Jesse A Elbin
*Assistant Examiner* — Kenny H Truong
(74) *Attorney, Agent, or Firm* — Keating & Bennet, LLP

(57) ABSTRACT

A speaker module includes a DC-DC converter device including a switching circuit device and a choke coil connected to the switching circuit device and a speaker device that converts an electric signal generated using output voltage from the DC-DC converter device into sound. A magnetic substrate which includes the choke coil and on which the switching circuit device is mounted is disposed between the switching circuit device and the speaker device.

18 Claims, 9 Drawing Sheets

(51) Int. Cl.
*H04R 9/06* (2006.01)
*H02M 3/335* (2006.01)

(56) References Cited

U.S. PATENT DOCUMENTS

2015/0029759 A1\* 1/2015 Takemoto ............. H02M 3/337
                                                                                                                                             363/17
2015/0281831 A1\* 10/2015 Ibusuki .................. H03F 3/183
                                                                                                                                             381/74

FOREIGN PATENT DOCUMENTS

| JP | 2006-280127 A | 10/2006 |
| JP | 2008-053898 A | 3/2008 |

\* cited by examiner

SPEAKER MODULE AND ELECTRONIC APPARATUS

CROSS REFERENCE TO RELATED APPLICATIONS

This application claims the benefit of priority to Japanese Patent Application No. 2015-148131 filed on Jul. 27, 2015 and is a Continuation Application of PCT Application No. PCT/JP2016/070944 filed on Jul. 15, 2016. The entire contents of each application are hereby incorporated herein by reference.

BACKGROUND OF THE INVENTION

1. Field of the Invention

The present invention relates to speaker modules. More particularly, the present invention relates to a speaker module to be installed in an electronic apparatus requiring high-density mounting.

2. Description of the Related Art

The high-density mounting is highly required in mobile terminal apparatuses, such as cellular phone units, in conjunction with reduction in size and thickness of the mobile terminal apparatuses and an increase in the number of components due to diversity in function. In order to achieve such high-density mounting, configurations are known in which speaker devices and so on are surface-mounted on substrates (for example, see Japanese Unexamined Patent Application Publication No. 2008-53898).

In order to achieve the high-density mounting, a configuration is considered for electronic apparatuses, such as mobile terminal apparatuses, in which a speaker device is integrated with a speaker related component, such as an amplifier circuit device for the speaker device or a direct current-direct current (DC-DC) converter device, to compose a speaker module.

However, the speaker may be affected by noise radiated from the DC-DC converter device. In this case, the arrangement of the speaker module and the DC-DC converter device is restricted to possibly prevent the high-density mounting.

SUMMARY OF THE INVENTION

Preferred embodiments of the present invention provide speaker modules and electronic apparatuses capable of high-density mounting.

A speaker module according to a preferred embodiment of the present invention includes a DC-DC converter device including a switching circuit device and a choke coil connected to the switching circuit device and a speaker device that converts an electric signal generated using output voltage from the DC-DC converter device into sound. A magnetic substrate which includes the choke coil and on which the switching circuit device is mounted is disposed between the switching circuit device and the speaker device.

With this configuration, the disposition of the magnetic substrate including the choke coil between the switching circuit device and the speaker device reduces or prevents emitted noise. Specifically, since the magnetic substrate defines and functions as an electromagnetic shield, it is possible to reduce or prevent the noise emitted from the choke coil, the switching circuit device, and a wiring (conductor) to connect the choke coil to the switching circuit device. Accordingly, since a reduction in the flexibility of the arrangement of the speaker module is capable of being reduced or prevented while disposing the speaker device and the DC-DC converter device so as be close to each other, the high-density mounting is achieved.

The speaker module may further include an amplifier circuit device that performs amplification using the output voltage from the DC-DC converter device to generate the electric signal. The amplifier circuit device may be mounted on a mounting surface of the magnetic substrate on which the switching circuit device is mounted.

With this configuration, since the amplifier circuit device is mounted on the mounting surface of the magnetic substrate one which the switching circuit device is mounted, an increase in output (increase in volume) is achieved while reducing or preventing the emitted noise. Since the magnetic substrate is disposed between the amplifier circuit device and the speaker device, it is possible to reduce or prevent the reduction in the flexibility of the arrangement of the speaker module while the speaker device and the amplifier circuit device are disposed so as to be close to each other. Accordingly, an increase in output is achieved while achieving high-density mounting of the speaker module.

The magnetic substrate may include a via that passes through at least a portion of the magnetic substrate. The speaker device may convert the electric signal input through the via.

With this configuration, the speaker device converts the electric signal that is input through the via passing through at least a portion of the magnetic substrate into sound. Accordingly, since the magnetic substrate through which the via passes defines and functions as a ferrite bead to reduce or prevent the noise of the electric signal, improvement in the sound quality is achieved.

The speaker device may be mounted on one main surface of the magnetic substrate, and the switching circuit device may be mounted on the other main surface of the magnetic substrate.

With this configuration, since the speaker device is mounted on the one main surface of the magnetic substrate and the switching circuit device is mounted on the other main surface of the magnetic substrate, it is possible to reduce the size of the plan view shape. In other words, it is possible to obtain the speaker module having excellent space saving.

The speaker module may further include a flexible substrate including the speaker device mounted on one main surface and the magnetic substrate mounted on the other main surface.

With this configuration, the flexible substrate, which includes the speaker device mounted on the one main surface and the magnetic substrate mounted on the other main surface, enables the speaker module and another component to be connected to each other with the flexible substrate. Accordingly, since the speaker module is capable of being connected to the other component without providing a connection component, such as a connector, which may prevent a reduction in size of the speaker module, the high-density mounting is further improved.

The flexible substrate may include a first portion on which the speaker device is mounted and a second portion on which the magnetic substrate is mounted. The second portion may be disposed on a side of the speaker device in a state in which the second portion is bent with respect to the first portion.

With this configuration, since the second portion is disposed on a side of the speaker device in the state in which the second portion is bent with respect to the first portion, the magnetic substrate is disposed on the side of the speaker device. Accordingly, the speaker module has a low profile.

The speaker module may further include a printed circuit board with the speaker device mounted on one main surface and the magnetic substrate mounted on the other main surface.

With the above configuration, since the printed circuit board is provided which includes the speaker device mounted on the one main surface and the magnetic substrate mounted on the other main surface, it is possible to manufacture the speaker module using a general manufacturing process with high versatility.

The speaker device may include a voice coil that vibrates upon flowing of the electric signal. The choke coil and the voice coil may be disposed so that a winding axis of the choke coil and a winding axis of the voice coil have an arbitrary positional relationship different from parallelism.

An electronic apparatus according to a preferred embodiment of the present invention includes a speaker module. The speaker module includes a DC-DC converter device including a switching circuit device and a choke coil connected to the switching circuit device and a speaker device that converts an electric signal generated using output voltage from the DC-DC converter device into sound. A magnetic substrate which includes the choke coil and on which the switching circuit device is mounted is disposed between the switching circuit device and the speaker device.

According to preferred embodiments of the present invention, it is possible to provide speaker modules capable of the high-density mounting.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1A:
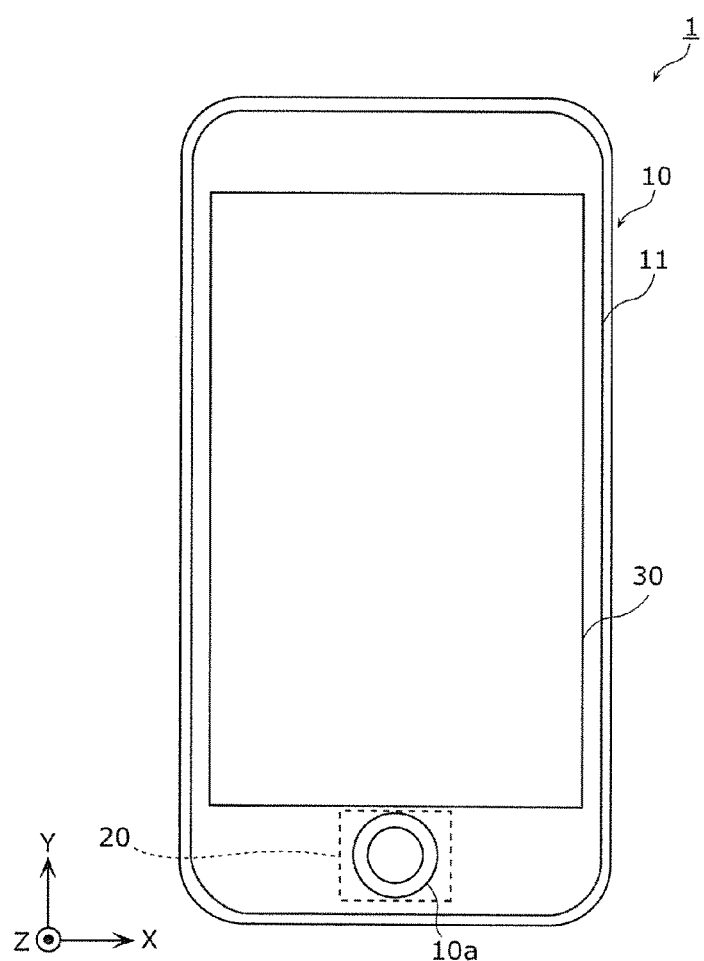
FIG. 1A is a top view illustrating an exemplary appearance of a mobile terminal apparatus according to a preferred embodiment of the present invention.

Preferred embodiments of the present invention will be described in detail with reference to the drawings. The preferred embodiments described below indicate comprehensive or specific examples. Numerical values, shapes, materials, components, the positions at which the components are disposed, the connection mode of the components, and other features, which are indicated in the preferred embodiments described below, are only examples and are not intended to limit the present invention. Among the components in the preferred embodiments described below, the components that are not described in the independent claims may be described as optional components. In addition, the sizes or the ratios of the sizes of the components illustrated in the drawings are not necessarily strictly indicated. Furthermore, "connection" in the following preferred embodiments means not only direct connection but also electrical connection via another element or elements. Furthermore, compact mobile terminal apparatuses, such as smartphones, are exemplified as electronic apparatuses including speaker modules.

Figure 1B:
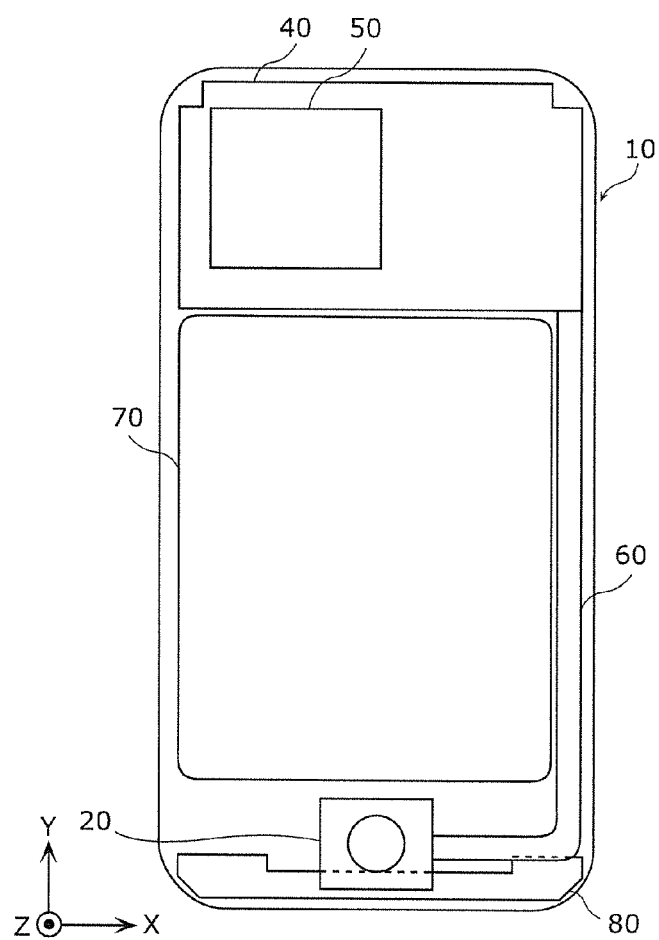
FIG. 1B is a top view illustrating an internal configuration of a mobile terminal apparatus according to a preferred embodiment of the present invention.
Figure 2:
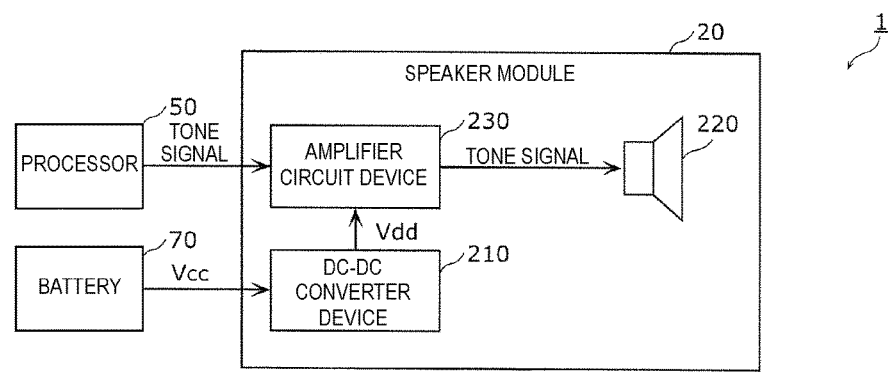
FIG. 2 is a block diagram illustrating an exemplary functional configuration of a mobile terminal apparatus according to a preferred embodiment of the present invention.

An overall description of a mobile terminal apparatus according to a preferred embodiment of the present invention will be provided with reference to FIG. 1A to FIG. 2.

FIG. 1A is a top view illustrating an exemplary appearance of a mobile terminal apparatus 1 according to the present preferred embodiment. FIG. 1B is a top view illustrating an internal configuration of the mobile terminal apparatus 1 according to the present preferred embodiment. FIG. 2 is a block diagram illustrating an exemplary functional configuration of the mobile terminal apparatus 1 according to the present preferred embodiment. Specifically, a configuration in a case in which a cover member 11 of a housing 10 and a display 30 are removed is illustrated in FIG. 1B. A speaker module 20 and exemplary functional components associated with the speaker module 20 are illustrated in FIG. 2.

In the present preferred embodiment, the thickness direction of the mobile terminal apparatus 1 preferably having a rectangular or substantially rectangular flat-plate shape is described as the Z-axis direction, the short-side direction of the mobile terminal apparatus 1 is described as the X-axis direction, and the long-side direction of the mobile terminal apparatus 1 is described as the Y-axis direction. The positive side in the Z-axis direction is described as the front side of the mobile terminal apparatus 1. Although the thickness direction may be described as the vertical direction, the thickness direction may not coincide with the vertical direction in practical aspects of use.

The mobile terminal apparatus 1 is an electronic apparatus that outputs sound. More specifically, the mobile terminal apparatus 1 is preferably a cellular phone unit, such as a smartphone, for example, which outputs audio, such as music or a buzzer sound, or a voice, such as a human voice. The mobile terminal apparatus 1 is not limited to a cellular phone unit and may be a music device or a tablet computer. The audio and the voice are not especially discriminated from each other and are described as sounds in the present preferred embodiment.

As illustrated in FIGS. 1A and 1B, the mobile terminal apparatus 1 includes the speaker module 20 that outputs sound. In the present preferred embodiment, the mobile terminal apparatus 1 includes the housing 10, the display 30, a main substrate 40, a processor 50, a flexible substrate 60, a battery 70, and an antenna 80.

The housing 10 houses the speaker module 20. In the present preferred embodiment, the housing 10 is an outer housing of the mobile terminal apparatus 1 with the display 30. A cavity 10a is provided at a position opposed to the speaker module 20 in the housing 10. The sound output from the speaker module 20 is output to the outside of the mobile terminal apparatus 1 through the cavity 10a. Since the cavity 10a is provided on the front surface side (the positive side in the Z-axis direction) of the mobile terminal apparatus 1 in the mobile terminal apparatus 1 according to the present preferred embodiment, the mobile terminal apparatus 1 is preferable for use in which a user listens to music while watching a video displayed in the display 30.

The housing 10 includes the cover member 11 preferably made of, for example, aluminum, which defines a front cover of the housing 10. The material of the housing 10 including the cover member 11 is not particularly limited and may be made of metal other than aluminum or may be made of resin. A portion of the housing 10 may be made of a material different from that of the remaining portion.

The speaker module 20 is a module in which a speaker device is integrated with circuit components for the speaker device. As illustrated in FIG. 2, in the present preferred embodiment, the speaker module 20 is a module that converts a sound signal, which is an electric signal output from the processor 50, into aerial vibration using direct-current voltage Vcc supplied from the battery 70 to output sound. Specifically, the speaker module 20 includes a DC-DC converter device 210 and a speaker device 220. In the present preferred embodiment, the speaker module 20 further includes an amplifier circuit device 230. The components in the speaker module 20 will be described below.

The display 30 is preferably, for example, a liquid crystal display that displays a video or other content under the control of the processor 50.

The main substrate 40 is, for example, a printed circuit board on which main circuit components of the mobile terminal apparatus 1, such as the processor 50, are mounted. The main substrate 40 is connected to the speaker module 20 with the flexible substrate 60 disposed therebetween. A radio-frequency (RF) circuit is also mounted on the main substrate 40 although not illustrated. The RF circuit performs wireless communication with a communication partner of the mobile terminal apparatus 1 using Bluetooth (registered trademark), over wireless Local Area Network (LAN), or using Global Positioning System (GPS), for example.

The processor 50 is, for example, a chip set that outputs the sound signal to the speaker module 20 and that includes a micro processing unit (MPU) or other suitable processing device. The processor 50 outputs sound data indicating sound recorded on a storage medium, such as a semiconductor memory, or sound data decoded from a reception signal received from the communication partner of the mobile terminal apparatus 1 as the sound signal.

The flexible substrate 60 is a substrate having flexibility with which the main substrate 40 is connected to the speaker module 20. For example, a flexible printed circuit (FPC) board that uses polyethylene terephthalate (PET) resin as a base film and that uses conductive paste, such as carbon silver, as a conductor may preferably be used as the flexible substrate 60. The material of the flexible substrate 60 is not particularly limited and it is sufficient for the flexible substrate 60 to have flexibility.

The battery 70 is a battery that supplies power to each component, such as the speaker module 20, in the mobile terminal apparatus 1 and is preferably, for example, a lithium ion secondary battery capable of repeatedly being charged and discharged.

The antenna 80 is an antenna used to perform, for example, cellular wireless communication with the communication partner of the mobile terminal apparatus 1. Although the position at which the antenna 80 is disposed is not particularly limited, the antenna 80 is preferably disposed at, for example, the following position. Since the size of the antenna 80 is defined in accordance with the communication frequency, the antenna 80 is disposed at a position ensuring a relatively larger space in the mobile terminal apparatus 1 requiring the high-density mounting. Since a larger internal space of the housing 10 is easily ensured around the speaker module 20, compared with that around the main substrate 40, the antenna is preferably disposed around the speaker module 20 in the present preferred embodiment.

Although the mobile terminal apparatus 1 includes other components including, for example, operation buttons with which an instruction is received from the user of the mobile terminal apparatus 1, a communication cable used to connect the antenna 80 to the main substrate 40, and power cables used to connect the battery 70 to the speaker module 20 and to connect the battery 70 to the main substrate 40, in addition to the components illustrated in FIG. 1A to FIG. 2, these components are not illustrated in FIG. 1A to FIG. 2.

The components in the speaker module 20 will now be described with reference to FIG. 3, in addition to FIG. 2.

Figure 3:
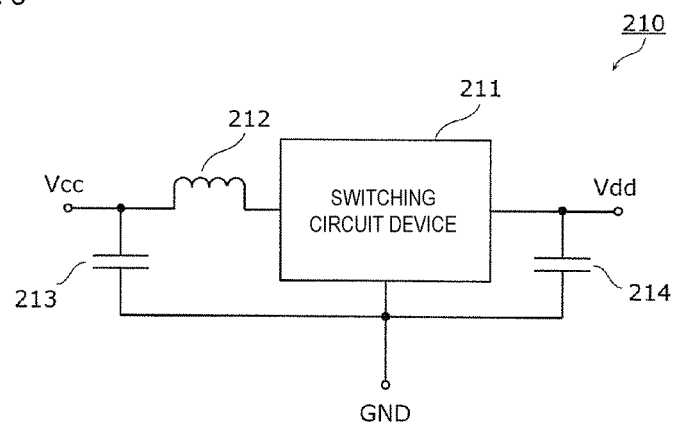
FIG. 3 is a circuit diagram illustrating an exemplary circuit of a DC-DC converter device according to a preferred embodiment of the present invention.

FIG. 3 is a circuit diagram illustrating an example of the DC-DC converter device 210 according to the present preferred embodiment.

The DC-DC converter device 210 is a power supply circuit that generates output voltage that is different from input voltage by switching the input voltage. In the present preferred embodiment, the DC-DC converter device 210 is a step-up converter device that supplies direct-current voltage Vdd generated by stepping up the direct-current voltage Vcc supplied from the battery 70 to the amplifier circuit device 230.

As illustrated in FIG. 3, the DC-DC converter device 210 includes a switching circuit device 211 and a choke coil 212 connected to the switching circuit device 211. In addition, the DC-DC converter device 210 further includes capacitors 213 and 214 in the present preferred embodiment.

In the present preferred embodiment, the switching circuit device 211 is a switching integrated circuit (IC) that intermittently applies voltage input into the DC-DC converter device 210 to the choke coil 212. For example, the switching circuit device 211 includes a switch element and a controller that controls switching of the switch element and intermittently applies the direct-current voltage Vcc supplied to the DC-DC converter device 210 to the choke coil 212 so that the difference between the output voltage from the DC-DC converter device 210 and desired voltage (Vdd here) is reduced.

The choke coil 212 is a coil element incorporated in a magnetic substrate described below. In the present preferred embodiment, the voltage caused by counter electromotive force is superposed on the direct-current voltage Vcc through the intermittent application of the direct-current voltage Vcc to the choke coil 212 by the switching circuit device 211. This enables the choke coil 212 to generate voltage higher than the direct-current voltage Vcc.

The capacitor 213 is a smoothing capacitor on the input side of the DC-DC converter device 210. The capacitor 214 is a smoothing capacitor on the output side of the DC-DC converter device 210. In the present preferred embodiment, the capacitors 213 and 214 are preferably chip capacitors, for example.

The DC-DC converter device 210 having the above-described configuration switches the direct-current voltage Vcc supplied from the battery 70 with the switching circuit device 211 to store or emit magnetic energy in or to the choke coil 212. The DC-DC converter device 210 generates the direct-current voltage Vdd higher than the direct-current voltage Vcc in the above-described manner to supply the direct-current voltage Vdd to the amplifier circuit device 230.

In the present preferred embodiment, the amplifier circuit device 230 is an amplifier IC that generates an electric signal (a sound signal here) using the output voltage (the direct-current voltage Vdd here) from the DC-DC converter device 210. Specifically, the amplifier circuit device 230 performs amplification using the output voltage from the DC-DC converter device 210 to generate the electric signal in the present preferred embodiment. More specifically, the amplifier circuit device 230 amplifies the sound signal supplied from the processor 50 using the direct-current voltage Vdd to supply the amplified sound signal to the speaker device 220.

Although it is sufficient for the amplifier circuit device 230 to have a configuration capable of amplifying the sound signal, which is an analog electric signal, the amplifier circuit device 230 preferably has a configuration capable of performing analog conversion and amplification of the sound signal, which is a digital electric signal, in terms of improving the sound quality of the speaker module 20 and reducing or preventing noise interference in the mobile terminal apparatus 1. For example, the amplifier circuit device 230 preferably includes a digital signal processor (DSP) to perform audio processing.

Specifically, when the processor 50 and the speaker module 20 are disposed so as to be spaced away from each other, the wiring (the flexible substrate 60 here) used to transmit the sound signal is disposed (routed) lengthwise in the housing 10. Since attenuation and degradation of the analog electric signal is greater than those of the digital electric signal, such disposition may cause degradation of the sound quality of the speaker module 20. In addition, since the wiring functions as an antenna in such a disposition, the noise caused by the sound signal is emitted into the housing 10. Since the emission of the noise into the housing 10 may cause noise interference to the RF circuit in the mobile terminal apparatus 1 including the RF circuit mounted therein, degradation of the communication quality may be caused. In addition, output of the analog electric signal, which is a large signal, from the processor 50 may be considered in order to compensate the attenuation and degradation of the signal. However, such a configuration increases the noise interference to the RF circuit because the wiring used to transmit the large signal is routed lengthwise, further degradation of the communication quality may be caused.

Accordingly, use of a configuration capable of performing the analog conversion and amplification of the sound signal for the amplifier circuit device 230 achieves the improved sound quality of the speaker module 20 and the reduced or prevented noise interference in the mobile terminal apparatus 1.

The configuration of the speaker module 20 will now be described with reference to FIG. 4 and FIG. 5, focusing on the structure.

Figure 4:
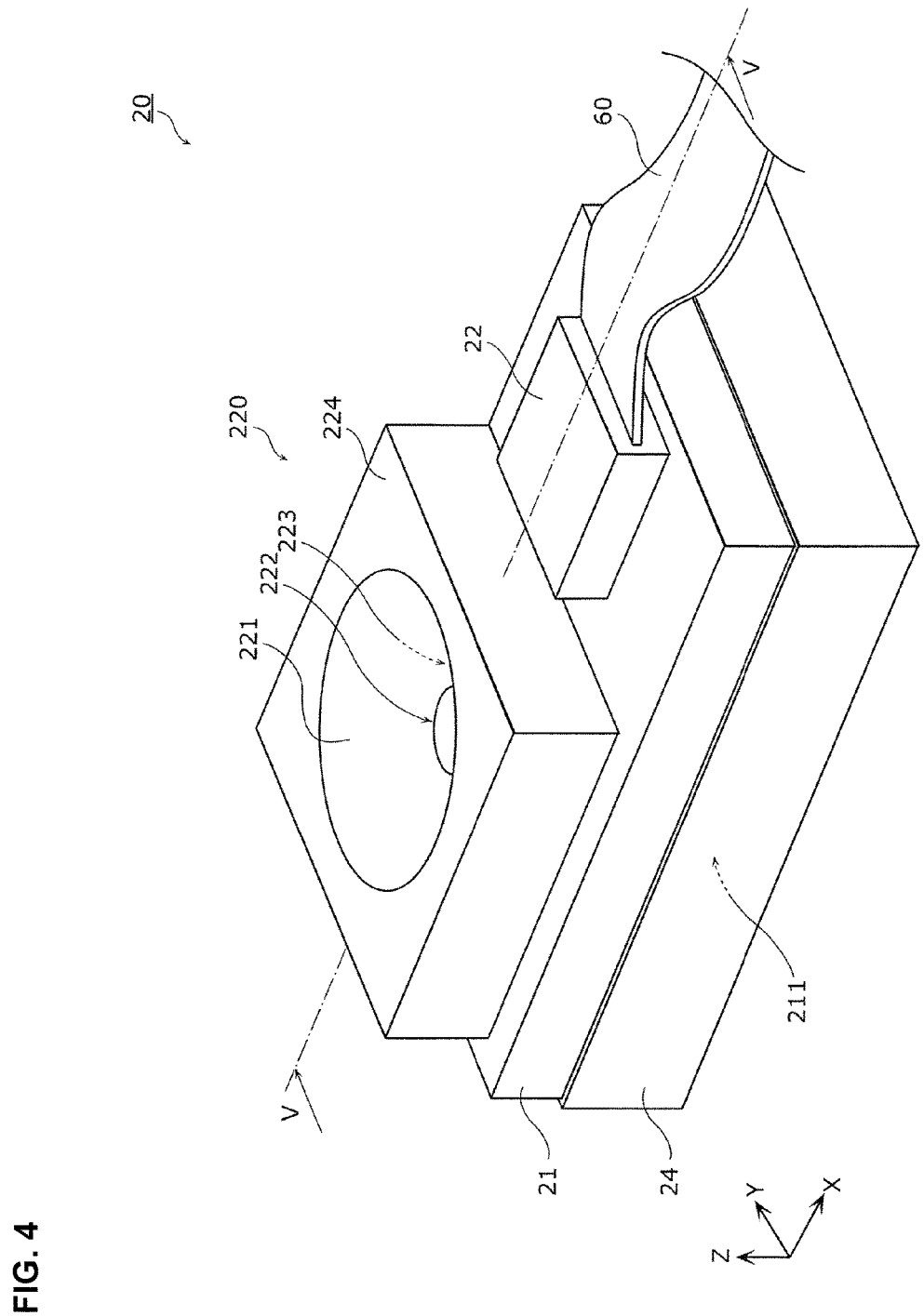
FIG. 4 is a perspective view illustrating an exemplary configuration of a speaker module according to a preferred embodiment of the present invention.

FIG. 4 is a perspective view illustrating an exemplary configuration of the speaker module 20 according to the present preferred embodiment. FIG. 5 is a cross-sectional view illustrating the exemplary configuration of the speaker module 20 according to the present preferred embodiment. Specifically, FIG. 5 is a cross-sectional view of the speaker module 20, taken along the V-V line in FIG. 4. Components that are strictly on different cross-sectional views may be illustrated in the same view for convenience in FIG. 5. The same applies to the following cross-sectional views.

Figure 5:
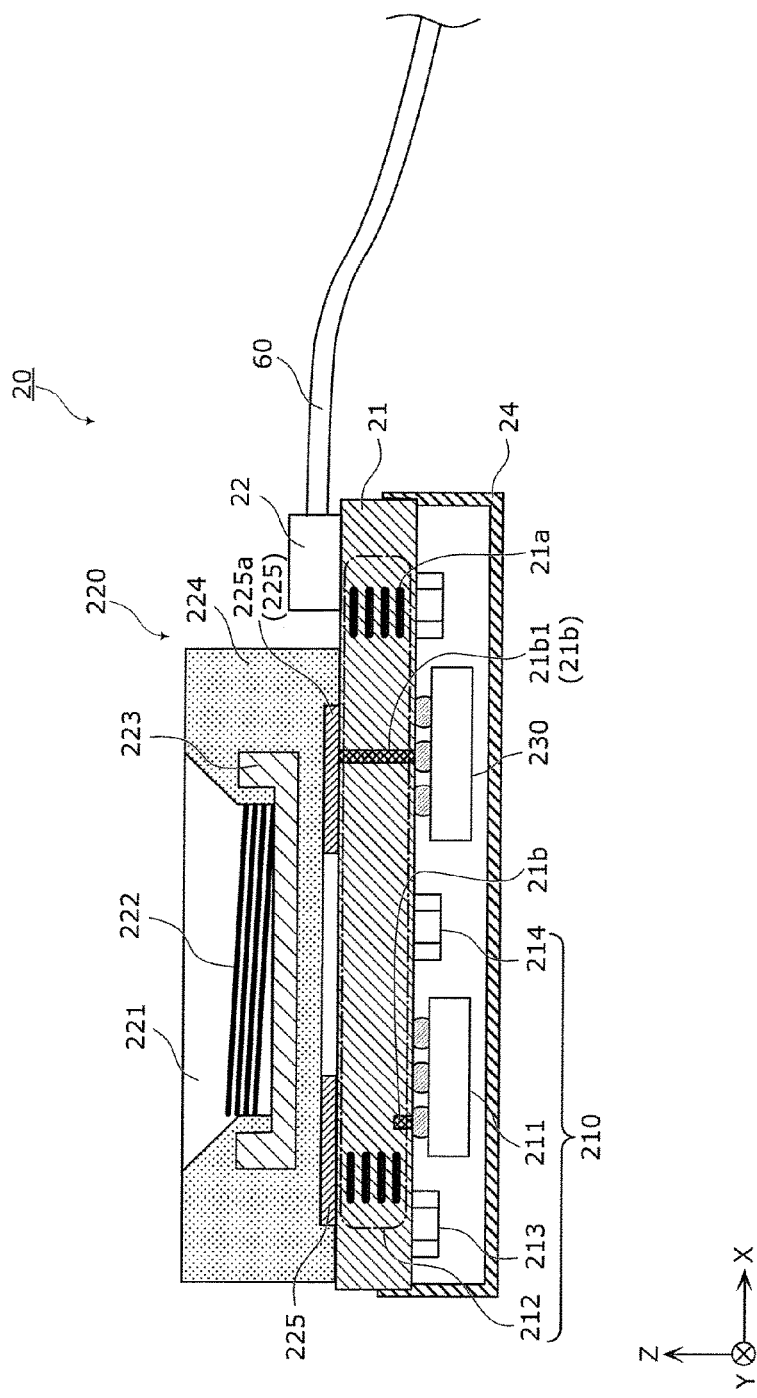
FIG. 5 is a cross-sectional view illustrating the exemplary configuration of a speaker module according to a preferred embodiment of the present invention.

As illustrated in FIGS. 4 and 5, a magnetic substrate 21 which includes the choke coil 212 and on which the switching circuit device 211 is mounted is disposed between the switching circuit device 211 and the speaker device 220. Specifically, in the present preferred embodiment, the speaker device 220 is mounted on one main surface of the magnetic substrate 21 and the switching circuit device 211 is mounted on the other main surface of the magnetic substrate 21. In the present preferred embodiment, the amplifier circuit device 230 is mounted on a mounting surface of the magnetic substrate 21 at which the switching circuit device 211 is mounted (the other main surface of the magnetic substrate 21).

The configuration of the speaker module 20 will now be specifically described, focusing on the structure.

First, the structure of the magnetic substrate 21 will be described.

The magnetic substrate 21 is a multi-layer substrate including the choke coil 212 and is formed preferably by laminating multiple magnetic layers. Various conductors for defining the DC-DC converter device 210 including the choke coil 212 are provided in the magnetic substrate 21. The conductors include a surface electrode (not illustrated) which is provided on the one main surface (the main surface at the positive side in the Z-axis direction) of the magnetic substrate 21 and on which the speaker device 220 is to be mounted, a surface electrode (not illustrated) which is provided on the other main surface (the main surface at the negative side in the Z-axis direction) of the magnetic substrate 21 and on which the switching circuit device 211 and other components are to be mounted, in-plane conductors 21a provided along the main surface of each magnetic layer, and an inter-layer conductor 21b (via) that passes through each magnetic layer in the thickness direction.

The loop-shaped in-plane conductors 21a are provided on at least a portion (for example, four layers) of the multiple magnetic layers and sequential connection of the end portions of the in-plane conductors 21a via the inter-layer conductor 21b defines the entire choke coil 212.

Each magnetic layer is preferably made of, for example, a magnetic ceramic base material having a relatively high permeability. For example, magnetic ferrite ceramics are used as the magnetic ceramics. Specifically, ferrite that includes iron oxide as a major component and at least one of zinc, nickel, and copper may preferably be used for the magnetic ceramics.

For example, metal or alloy including silver as a major component may preferably be used for the surface electrodes, the in-plane conductors 21a, and the inter-layer conductor 21b. The surface electrodes may preferably be plated with, for example, nickel, palladium, or gold, for example.

The magnetic ferrite ceramics of each layer of the magnetic substrate 21 are preferably low temperature co-fired ceramics (LTCC). The firing temperature of the magnetic substrate 21 is lower than or equal to the melting point of silver and silver may be used for the conductors. Configuring the in-plane conductors 21a and the inter-layer conductor 21b using silver having a low resistivity provides the DC-DC converter device 210 with low loss, which has excellent circuit characteristics including power efficiency. In particular, use of silver for the conductors enables the magnetic substrate 21 to be fired in an oxidizing atmosphere, such as atmospheric air.

Various components provided on the one main surface of the magnetic substrate 21 will now be described.

The speaker device 220 and a connector 22 are mounted on the one main surface of the magnetic substrate 21.

In the present preferred embodiment, the speaker device 220 is preferably a voice-coil speaker device, for example, including a voice coil 222 that vibrates upon flowing of the electric signal (the sound signal here). Specifically, the speaker device 220 includes a substantially conical cone 221 (vibrating plate) the diameter of which is decreased toward the bottom side, the voice coil 222 that abuts against the bottom end of the cone 221, a magnet 223 that houses the voice coil 222, and a speaker box 224 that houses the cone 221, the voice coil 222, and the magnet 223. Terminal elements 225 (a terminal electrode 225a) are provided on the bottom surface of the speaker device 220.

In the speaker device 220 having the above-described configuration, the magnetic field is varied upon flowing of the sound signal amplified in the amplifier circuit device 230 through the voice coil 222, and the voice coil 222 vibrates in the vertical direction in response to the vibration of the magnetic field. Accordingly, the cone 221 abutting against the voice coil 222 vibrates in the vertical direction to convert the sound signal, which is the electric signal, into sound, which is the aerial vibration.

In the present preferred embodiment, an inter-layer conductor 21b1 is provided in the magnetic substrate 21. The inter-layer conductor 21b1 passes through at least a portion of the magnetic substrate 21 (the entire magnetic substrate 21 here) to be connected to the terminal electrode 225a, which is an input terminal of the speaker device 220. Specifically, the inter-layer conductor 21b1 is used to connect the terminal electrode 225a of the speaker device 220 mounted on the one main surface of the magnetic substrate 21 to an output terminal of the amplifier circuit device 230 mounted on the other main surface of the magnetic substrate 21. Accordingly, the speaker device 220 converts the electric signal input via the inter-layer conductor 21b1 passing through at least a portion of the magnetic substrate 21 into sound.

The connector 22 is preferably, for example, an FPC connector that connects the flexible substrate 60 to the speaker module 20.

Various components provided on the other main surface of the magnetic substrate 21 will now be described.

Various circuit components of the speaker module 20 are mounted on the other main surface of the magnetic substrate 21. In addition, a shield case 24 covering the circuit components is provided on the other main surface of the magnetic substrate 21. Specifically, the switching circuit device 211 and the capacitors 213 and 214, which define the DC-DC converter device 210, and ICs and chip components including the amplifier circuit device 230 are mounted on the other main surface of the magnetic substrate 21. These circuit components are connected to each other, for example, via the in-plane conductors 21a and the inter-layer conductor 21b.

The shield case 24 is a metal case that is grounded. The shield case 24 is preferably made of, for example, a metal or alloy thin plate including at least one of silver, copper, iron, and aluminum. For example, the shield case 24 is preferably grounded by being electrically connected to an inter-layer conductor (not illustrated) that is exposed from a side wall of the magnetic substrate 21 and that has ground potential of the speaker module 20. The shield case 24 enables electromagnetic noise emitted from the circuit components to be reduced or prevented while mechanically protecting the various circuit components mounted on the other main surface of the magnetic substrate 21. Accordingly, since the influence of the noise interference between the speaker module 20 and a high-frequency related component, such as the antenna 80, is capable of being reduced or prevented, the flexibility of the arrangement is increased to achieve the high-density mounting.

The ground of the speaker device 220 is preferably different from the ground of the DC-DC converter device 210 in the speaker module 20. This reduces or prevents propagation noise superposed on the ground of the DC-DC converter device 210 to be propagated to the speaker device 220 side.

The advantages of the speaker module 20 according to the present preferred embodiment will now be described.

Configurations including amplifier circuit devices for speaker devices and DC-DC converter devices, which are power supplies for the amplifier circuit devices, are known in recent years in conjunction with a request for an increase in the volume of the speaker devices.

In general, when the electric signal of a magnitude exceeding rated input is input into the speaker device, degradation in sound quality, such as clipping noise, and/or a failure such as breakage of the speaker device may be caused. Accordingly, in order to reduce or prevent the failure of the speaker device to improve the sound quality, it is necessary to appropriately adjust the electric signal to be supplied from the DC-DC converter device and the amplifier circuit device to the speaker device.

However, the electric signal is likely to be affected by the degradation of the signal and the noise interference as the length of the wiring is increased due to the routing of the wiring and so on. Accordingly, in order for the electric signal to be appropriately adjusted, the components related to the speaker device (the speaker device, the DC-DC converter device, and the amplifier circuit device) are preferably disposed so as to be close to each other.

However, relatively large noise is emitted from the DC-DC converter device through the switching operation of the DC-DC converter device. Accordingly, when an antenna or a high-frequency related component, such as a radio frequency integrated circuit (RFIC), is disposed near the components of the speaker device due to the high-density mounting, a failure may occur in the high-frequency related component due to the noise emitted from the DC-DC converter device. In this case, the arrangement of the components related to the speaker device and the high-frequency related component is limited which might prevent the high-density mounting.

Accordingly, in the speaker module 20 according to the present preferred embodiment, the disposition of the magnetic substrate 21 including the choke coil 212 between the switching circuit device 211 and the speaker device 220 reduces or prevents the emitted noise. Specifically, since the magnetic substrate 21 defines and functions as an electromagnetic shield, it is possible to reduce or prevent the noise emitted from the choke coil 212, the switching circuit device 211, and the wiring (conductor) to connect the choke coil 212 to the switching circuit device 211. Accordingly, since reduction in the flexibility of the arrangement of the speaker module 20 is capable of being reduced or prevented while disposing the speaker device 220 and the DC-DC converter device 210 so as be close to each other, the high-density mounting is achieved. In addition, since the speaker device 220 and the DC-DC converter device 210 are capable of being disposed so as to be close to each other, the improvement of the sound quality of the speaker module 20 is achieved.

Furthermore, since the magnetic substrate 21 is disposed between the switching circuit device 211 and the speaker device 220, it is possible to reduce or prevent the interference between the switching circuit device 211 and the speaker device 220. Accordingly, a reduction in size and the improvement of the sound quality of the speaker module 20 are achieved.

Furthermore, since the choke coil 212 is a closed magnetic coil because the choke coil 212 is incorporated in the magnetic substrate 21, it is possible to reduce or prevent the occurrence of interference between the choke coil 212 and the speaker device 220. Such a configuration is especially useful because the reduction in the sound quality is reduced or prevented while achieving the high-density mounting when, for example, a voice-coil speaker device that converts the electric signal into sound using the variation in the magnetic field is used as the speaker device 220 installed on the magnetic substrate 21.

Furthermore, since the choke coil 212 is included in the magnetic substrate 21, a portion of the magnetic substrate 21, which is surrounded by the choke coil 212, is capable of being used as a magnetic core of the choke coil 212. Accordingly, improvement of various characteristics of the choke coil 212 is achieved. The various characteristics include an increase in the L value, reduced Rdc (direct-current resistance), and improved direct-current superposition characteristics.

Furthermore, since the amplifier circuit device 230 is mounted on the mounting surface of the magnetic substrate 21 on which the switching circuit device 211 is mounted according to the present preferred embodiment, an increase in output (increase in volume) is achieved while reducing or preventing the emitted noise. Since the magnetic substrate 21 is disposed between the amplifier circuit device 230 and the speaker device 220, it is possible to reduce or prevent the reduction in the flexibility of the arrangement of the speaker module while the speaker device 220 and the amplifier circuit device 230 are disposed so as to be close to each other. Accordingly, the increase in output is achieved while achieving the high-density mounting of the speaker module 20.

Such a configuration is especially useful in the speaker module in which the sound signal that is input may be a small signal and which is installed in the compact mobile terminal apparatus, such as a smartphone.

According to the present preferred embodiment, the speaker device 220 converts the electric signal that is input through the via (the inter-layer conductor 21b1 here) passing through at least a portion of the magnetic substrate 21 into sound. Accordingly, since the magnetic substrate 21 through which the via passes functions as a ferrite bead to reduce or prevent the noise of the electric signal, the improvement in the sound quality is achieved.

According to the present preferred embodiment, since the speaker device 220 is mounted on the one main surface of the magnetic substrate 21 and the switching circuit device 211 is mounted on the other main surface of the magnetic substrate 21, it is possible to reduce in size of the plan view shape. In other words, according to the present preferred embodiment, it is possible to provide a speaker module 20 having excellent space saving.

Speaker modules according to preferred embodiments of the present invention may be different from that in the present preferred embodiment. Various modifications of the above-described preferred embodiment will be described below. A description of points similar to those in the above-described preferred embodiment is appropriately omitted and points different from the above-described preferred embodiment will be primarily described.

A speaker module of a mobile terminal apparatus according to a first modification of a preferred embodiment of the present invention will now be described with reference to FIG. 6 and FIG. 7.

The speaker device 220, the magnetic substrate 21, and the switching circuit device 211 are disposed in the vertical direction (the Z-axis direction) in the above preferred embodiment. In contrast, the speaker device 220, the magnetic substrate 21A, and the switching circuit device 211 are disposed in a direction orthogonal or substantially orthogonal to the vertical direction in the present modification.

Figure 6:
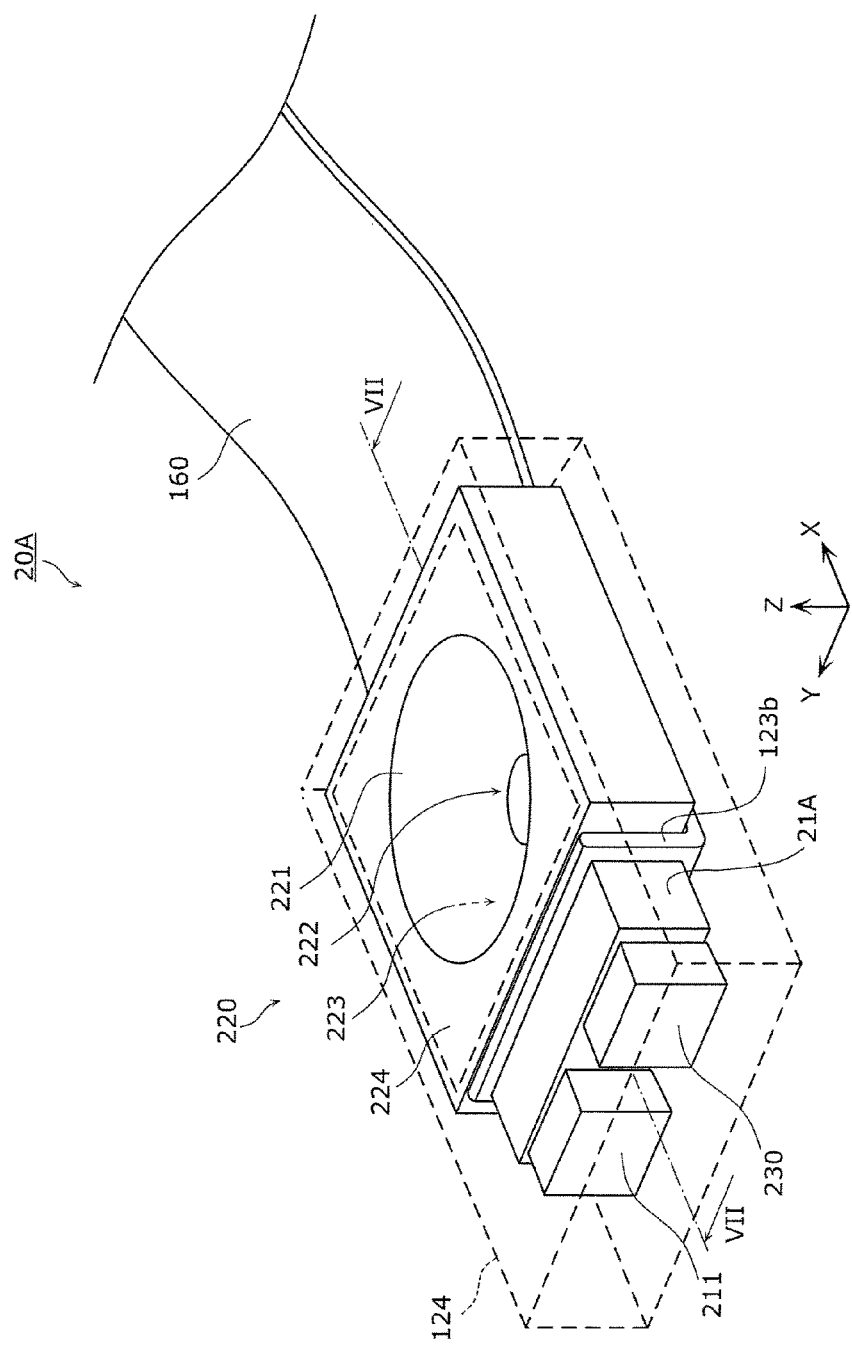
FIG. 6 is a perspective view illustrating an exemplary configuration of a speaker module according to a first modification of a preferred embodiment of the present invention.

FIG. 6 is a perspective view illustrating an exemplary configuration of a speaker module 20A according to the first modification of a preferred embodiment. FIG. 7 is a cross-sectional view illustrating the exemplary configuration of the speaker module 20A according to the first modification of a preferred embodiment. Specifically, FIG. 7 is a cross-sectional view of the speaker module 20A, taken along the VII-VII line in FIG. 6. The inside of the speaker module 20A is illustrated by seeing through a module box 124 described below in FIG. 6.

Figure 7:
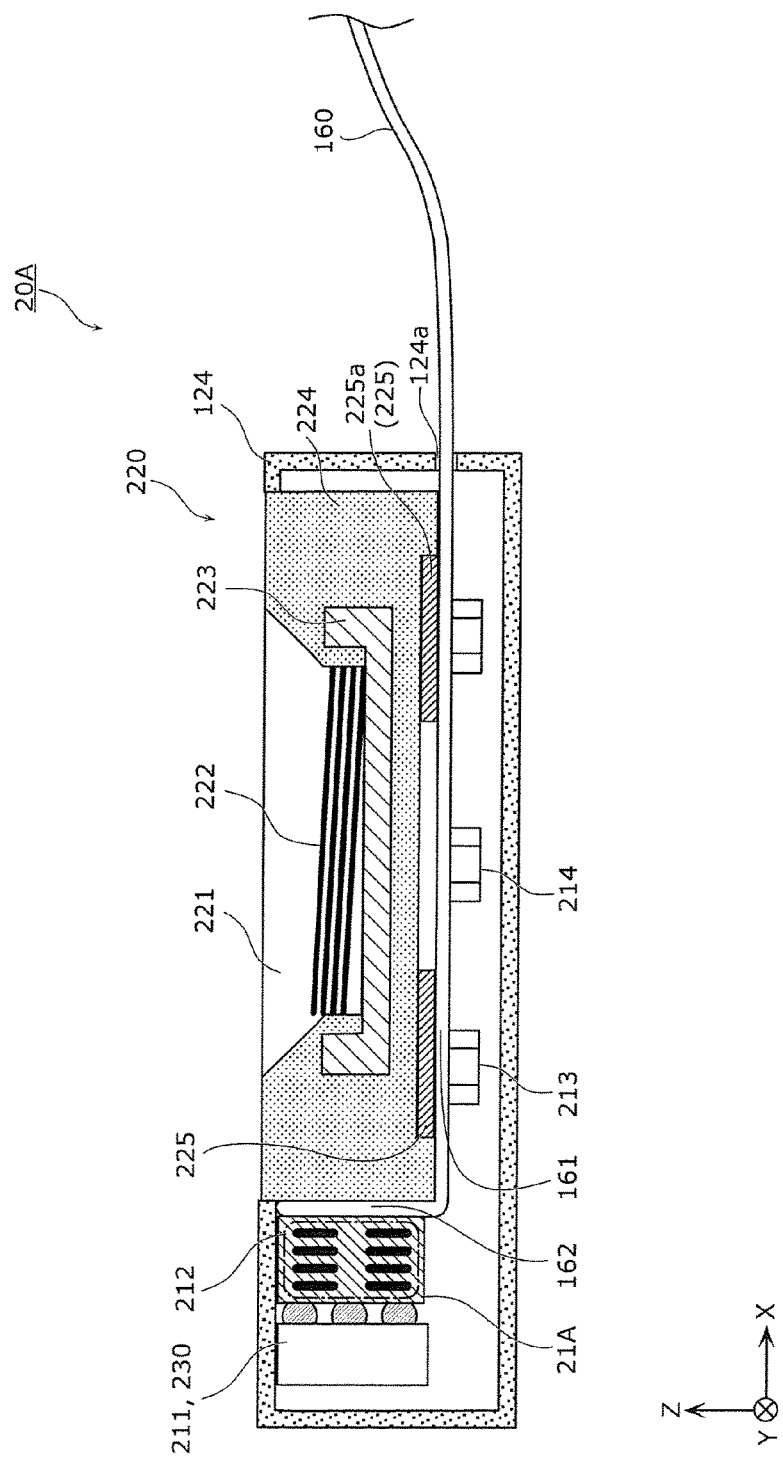
FIG. 7 is a cross-sectional view illustrating the exemplary configuration of a speaker module according to the first modification of a preferred embodiment of the present invention.

As illustrated in FIGS. 6 and 7, the speaker module 20A according to the present modification includes a flexible substrate 160 and the module box 124, instead of the flexible substrate 60 and the shield case 24, and does not include the connector 22, compared with the speaker module 20 according to the above-described preferred embodiment.

The flexible substrate 160 is a substrate having flexibility, which includes the speaker device 220 mounted on the one main surface and a magnetic substrate 21A mounted on the other main surface. In the present modification, the flexible substrate 160 passes through an opening 124a to be integrated with the speaker module 20A. One end portion of the opening 124a is connected to the main substrate 40 and the other end portion of the opening 124a is provided in the module box 124. A material similar to that of the flexible substrate 60 may preferably be used for the flexible substrate 160.

Specifically, the flexible substrate 160 includes a first portion 161 on which the speaker device 220 is mounted and a second portion 162 on which the magnetic substrate 21A is mounted. One end portion of the first portion 161 is connected to the main substrate 40, as in the flexible substrate 60 of the above-described preferred embodiment, and also transmits the sound signal supplied from the processor 50 to the speaker module 20A. The second portion 162 is disposed on a side of the speaker device 220 in a state in which the second portion 162 is bent with respect to the first portion 161.

Bending of the second portion 162 with the magnetic substrate 21A mounted on the other main surface with respect to the first portion 161 with the speaker device 220 mounted on one main surface causes the speaker device 220, the magnetic substrate 21A, and the switching circuit device 211 to be disposed so as to be disposed in the horizontal direction orthogonal or substantially orthogonal to the vertical direction (the X-axis direction in the present modification).

Here, the choke coil 212 and the voice coil 222 are disposed so that the winding axis of the choke coil 212 and the winding axis of the voice coil 222 have an arbitrary positional relationship that is different from parallelism (the positional relationship in which the winding axes are orthogonal or substantially orthogonal to each other, viewed in the Y-axis direction, in the present modification). Specifically, preferably, the winding axis of the choke coil 212 is parallel or substantially parallel with the horizontal direction (the X-axis direction in FIG. 7) and the winding axis of the voice coil 222 is parallel or substantially parallel with the vertical direction (the Z-axis direction in FIG. 7).

Although the chip components including the capacitors 213 and 214 are mounted on the magnetic substrate 21A in the above-described preferred embodiment, the chip components are mounted on the flexible substrate 160 in the present modification. Specifically, the chip components are mounted on the other main surface of the first portion 161. The position at which the chip components are disposed is not particularly limited and the chip components may be mounted on the magnetic substrate 21A.

According to the present modification having the above-described configuration, the disposition of the magnetic substrate 21A including the choke coil 212 between the switching circuit device 211 and the speaker device 220 reduces or prevents the emitted noise, as in the above-described preferred embodiment. Accordingly, the advantages similar to those in the above-described preferred embodiment are achieved.

In addition, according to the present modification, the flexible substrate 160, which includes the speaker device 220 mounted on the one main surface and the magnetic substrate 21A mounted on the other main surface, enables the speaker module 20A and another component (the processor 50 in the present modification) to be connected to each other with the flexible substrate 160. Accordingly, since the speaker module 20A is capable of being connected to the other component without providing a connection component, such as a connector, which may prevent the reduction in size of the speaker module 20A, the high-density mounting is further achieved.

Furthermore, according to the present modification, since the second portion 162 is disposed on a side of the speaker device 220 in the state in which the second portion 162 is bent with respect to the first portion 161, the magnetic substrate 21A is disposed on the side of the speaker device 220. Accordingly, the speaker module 20A has a low profile. Such a configuration is especially useful in the speaker module installed in the compact mobile terminal apparatus, such as a smartphone, highly requiring the high-density mounting.

Furthermore, according to the present modification, since the choke coil 212 and the voice coil 222 are disposed so that the winding axis of the choke coil 212 and the winding axis of the voice coil 222 have an arbitrary positional relationship that is different from parallelism (the positional relationship in which the winding axes are orthogonal or substantially orthogonal to each other, viewed in the Y-axis direction, in the present modification), it is possible to reduce or prevent the interference between the choke coil 212 and the voice coil 222. Specifically, the disposition of the choke coil 212 and the voice coil 222 in the above-described positional relationship reduces or prevents linkage between the magnetic flux occurring at one coil and the magnetic flux occurring at the other coil from occurring. Accordingly, it is possible to reduce or prevent the interference.

It is sufficient for the winding axis of the choke coil 212 and the winding axis of the voice coil 222 to have an arbitrary positional relationship that is different from parallelism. The winding axis of the choke coil 212 and the winding axis of the voice coil 222 may have a twisted positional relationship or may have a positional relationship in which the winding axes intersect with each other. However, the choke coil 212 and the voice coil 222 are preferably disposed in the positional relationship in which the winding axis of the choke coil 212 is orthogonal or substantially orthogonal to the winding axis of the voice coil 222, viewed in the vertical direction from a plane including the winding axis of the choke coil 212 and the winding axis of the voice coil 222 (an XZ plane in the present modification) in view of the reduction or prevention of the interference between the choke coil 212 and the voice coil 222.

A speaker module of a mobile terminal apparatus according to a second modification of a preferred embodiment of the present invention will now be described with reference to FIG. 8 and FIG. 9.

The speaker device 220 is mounted on the magnetic substrate 21 in the above-described preferred embodiment. In contrast, the speaker device 220 is mounted on a printed circuit board described below in the present modification.

Figure 8:
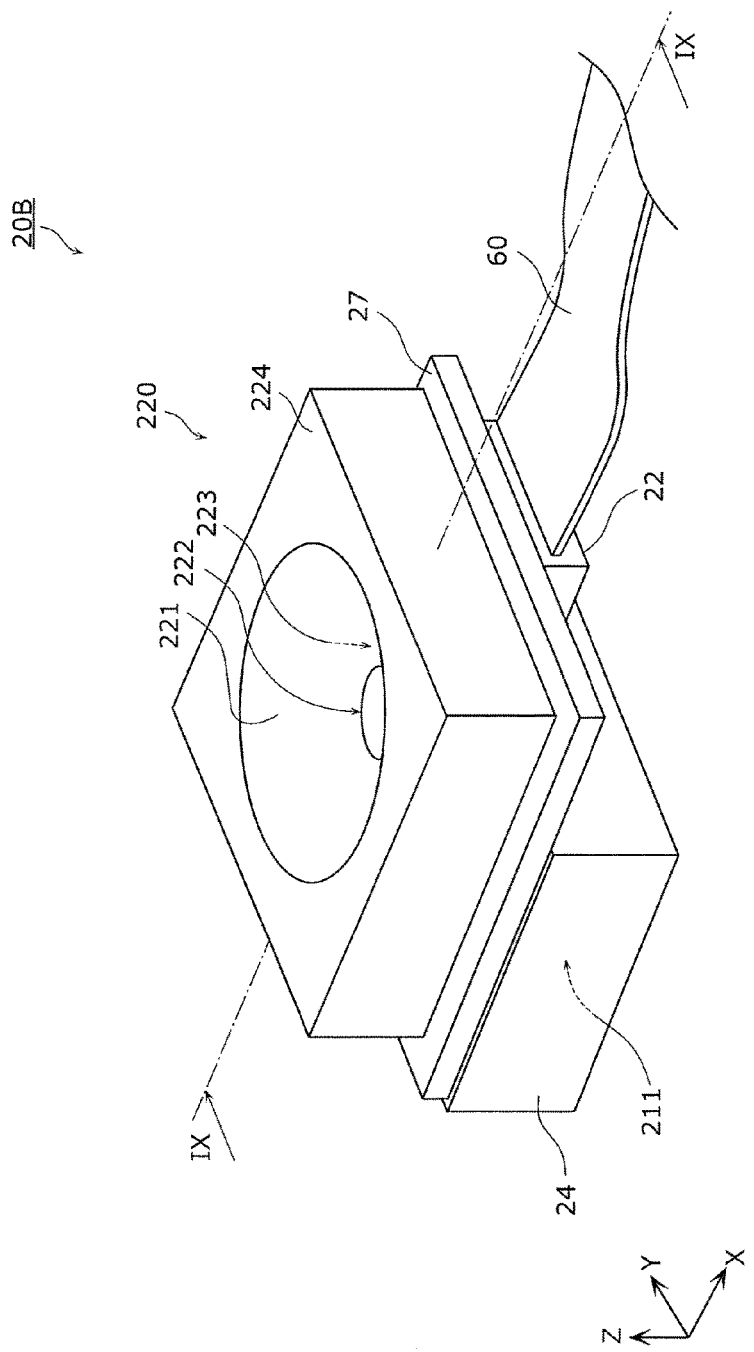
FIG. 8 is a perspective view illustrating an exemplary configuration of a speaker module according to a second modification of a preferred embodiment of the present invention.

FIG. 8 is a perspective view illustrating an exemplary configuration of a speaker module 20B according to the second modification of a preferred embodiment of the present invention. FIG. 9 is a cross-sectional view illustrating the exemplary configuration of the speaker module 20B according to the second modification of a preferred embodiment of the present invention. Specifically, FIG. 9 is a cross-sectional view of the speaker module 20B, taken along the IX-IX line in FIG. 8.

Figure 9:
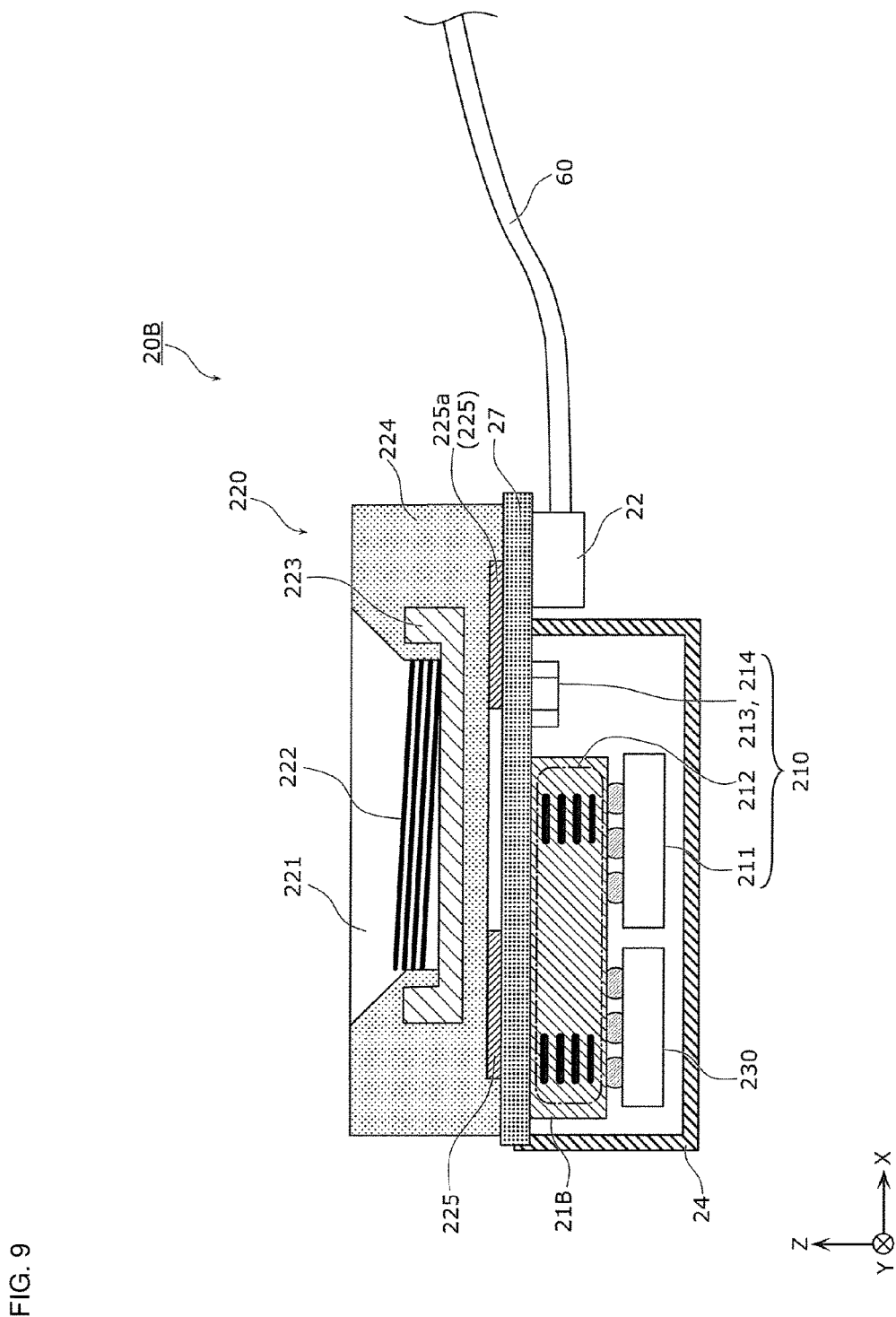
FIG. 9 is a cross-sectional view illustrating the exemplary configuration of a speaker module according to the second modification of a preferred embodiment of the present invention.

As illustrated in FIGS. 8 and 9, the speaker module 20B according to the present modification includes a printed circuit board 27 and includes a magnetic substrate 21B, instead of the magnetic substrate 21, compared with the speaker module 20 according to the above-described preferred embodiment.

The printed circuit board 27 (PCB) includes the speaker device 220 mounted on one main surface and the magnetic substrate 21B mounted on the other main surface. The chip components including the capacitors 213 and 214, which are mounted on the magnetic substrate 21 in the above-described preferred embodiment, are also mounted on the other main surface of the printed circuit board 27.

In other words, the chip components are not mounted on the magnetic substrate 21B according to the present modification and the ICs including the switching circuit device 211 and the amplifier circuit device 230 are mounted thereon.

According to the present modification having the above-described configuration, the disposition of the magnetic substrate 21B including the choke coil 212 between the switching circuit device 211 and the speaker device 220 reduces or prevents the emitted noise, as in the above-described preferred embodiment. Accordingly, the advantages similar to those in the above-described preferred embodiment are achieved.

In addition, since the printed circuit board 27, which includes the speaker device 220 mounted on the one main surface and the magnetic substrate 21B mounted on the other main surface, is provided according to the present modification, it is possible to manufacture the speaker module 20B using a general manufacturing process with high versatility.

Although the mobile terminal apparatus 1 is exemplified as the electronic apparatuses according to preferred embodiments and modifications thereof, the present invention is not limited to each of the preferred embodiments and the modifications thereof. Configurations resulting from making various modifications considered by persons skilled in the art to the preferred embodiments and modifications thereof and configurations resulting from combining components in different preferred embodiments and modifications thereof may be included in the scope of the present invention without departing from the spirit and scope of the present invention.

Although mobile terminal apparatuses are exemplified in the above description, preferred embodiments of the present invention may be applied to an electronic apparatus, such as a stationary music device. In other words, preferred embodiments of the present invention are applicable to an electronic apparatus including the following speaker module. Specifically, the speaker module includes the DC-DC converter device 210 including the switching circuit device 211 and the choke coil 212 connected to the switching circuit device 211 and the speaker device 220 that converts an electric signal generated using output voltage from the DC-DC converter device 210 into sound. Here, the magnetic substrate which includes the choke coil 212 and on which the switching circuit device 211 is mounted is disposed between the switching circuit device 211 and the speaker device 220.

With such an electronic apparatus, the advantages similar to those of mobile terminal apparatuses described above are achieved. In other words, the disposition of the magnetic substrate between the switching circuit device 211 and the speaker device 220 achieves the reduction in size of the speaker module while reducing or preventing the noise emitted from the DC-DC converter device. Accordingly, the high-density mounting of the electronic apparatus is achieved.

The speaker device 220 is not limited to the voice-coil speaker device including the voice coil 222. For example, a speaker device of another type, such as a piezoelectric speaker including a piezoelectric element, may be used as the speaker device 220.

The DC-DC converter device 210 is not limited to the step-up converter. The DC-DC converter device 210 may be a step-down converter or may be a step-up-down converter.

The amplifier circuit device 230 may not be mounted on the mounting surface of the magnetic substrate on which the switching circuit device 211 is mounted and may be mounted on a side wall or other suitable portions of the magnetic substrate, which is different from the mounting surface. In the second modification described above, the amplifier circuit device 230 may be mounted on the printed circuit board 27.

Each of the switching circuit device 211 and the amplifier circuit device 230 may not be configured as one package as an IC and may be configured by combining discrete components.

It is sufficient for the speaker device 220 to convert the electric signal input via the inter-layer conductor 21b passing through at least a portion of the magnetic substrate 21. The speaker device 220 may not convert the electric signal input via the inter-layer conductor 21b passing through the entire magnetic substrate 21. With such a configuration, the magnetic layers through which the inter-layer conductor 21b passes define and function as a ferrite bead to reduce or prevent the noise of the electric signal although the effect of the reduction or prevention of the noise is slightly degraded, compared with the case in which the electric signal is input via the inter-layer conductor 21b passing through the entire magnetic substrate 21.

It is sufficient for the speaker device 220 to be provided at the position at which the magnetic substrate 21 is disposed between the speaker device 220 and the switching circuit device 211. The speaker device 220 may not convert the electric signal input via the inter-layer conductor 21b. For example, the speaker device 220 may convert the electric signal input via an inter-layer conductor that is not disposed in the magnetic substrate 21 and that is exposed from a side wall.

Although the example is described in the first modification in which the flexible substrate 160 is bent, the flexible substrate 160 may not be bent. For example, the speaker device 220 and the magnetic substrate 21A may be disposed so as to sandwich the flexible substrate 160. With such a configuration, since the speaker module 20A is capable of being connected to the other component without providing a connection component, such as a connector, the high-density mounting is further achieved, compared with the case in which the connection component is provided.

Preferred embodiments of the present invention are capable of being widely used in electronic apparatuses, such mobile terminal apparatuses, requiring high-density mounting as the very compact speaker modules using the magnetic substrates.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A speaker module comprising:
 a DC-DC converter device including a switching circuit device and a choke coil connected to the switching circuit device; and
 a speaker device that converts an electric signal generated using output voltage from the DC-DC converter device into sound; wherein
 a magnetic substrate which includes the choke coil and on which the switching circuit device is mounted is disposed between the switching circuit device and the speaker device.

2. The speaker module according to claim 1, further comprising:
 an amplifier circuit device that performs amplification using the output voltage from the DC-DC converter device to generate the electric signal; wherein the amplifier circuit device is mounted on a mounting surface of the magnetic substrate on which the switching circuit device is mounted.

3. The speaker module according to claim 1, wherein
the magnetic substrate includes a via that passes through at least a portion of the magnetic substrate; and
the speaker device converts the electric signal input through the via.

4. The speaker module according to claim 1, wherein
the speaker device is mounted on one main surface of the magnetic substrate; and
the switching circuit device is mounted on another main surface of the magnetic substrate.

5. The speaker module according to claim 1, further comprising a flexible substrate including the speaker device mounted on one main surface and the magnetic substrate mounted on another main surface.

6. The speaker module according to claim 5, wherein
the flexible substrate includes a first portion on which the speaker device is mounted and a second portion on which the magnetic substrate is mounted; and
the second portion is disposed on a side of the speaker device in a state in which the second portion is bent with respect to the first portion.

7. The speaker module according to claim 1, further comprising a printed circuit board including the speaker device mounted on one main surface and the magnetic substrate mounted on another main surface.

8. The speaker module according to claim 1, wherein
the speaker device includes a voice coil that vibrates upon flowing of the electric signal; and
the choke coil and the voice coil are disposed so that a winding axis of the choke coil and a winding axis of the voice coil have an arbitrary positional relationship that is different from parallelism.

9. The speaker module according to claim 1, wherein the magnetic substrate is a multilayer substrate including a plurality of magnetic layers that are laminated.

10. An electronic apparatus comprising:
a speaker module; wherein
the speaker module includes:
a DC-DC converter device including a switching circuit device and a choke coil connected to the switching circuit device; and
a speaker device that converts an electric signal generated using output voltage from the DC-DC converter device into sound; wherein
a magnetic substrate which includes the choke coil and on which the switching circuit device is mounted is disposed between the switching circuit device and the speaker device.

11. The electronic apparatus according to claim 10, further comprising:
an amplifier circuit device that performs amplification using the output voltage from the DC-DC converter device to generate the electric signal; wherein
the amplifier circuit device is mounted on a mounting surface of the magnetic substrate on which the switching circuit device is mounted.

12. The electronic apparatus according to claim 10, wherein
the magnetic substrate includes a via that passes through at least a portion of the magnetic substrate; and
the speaker device converts the electric signal input through the via.

13. The electronic apparatus according to claim 10, wherein
the speaker device is mounted on one main surface of the magnetic substrate; and
the switching circuit device is mounted on another main surface of the magnetic substrate.

14. The electronic apparatus according to claim 10, further comprising a flexible substrate including the speaker device mounted on one main surface and the magnetic substrate mounted on another main surface.

15. The electronic apparatus according to claim 14, wherein
the flexible substrate includes a first portion on which the speaker device is mounted and a second portion on which the magnetic substrate is mounted; and
the second portion is disposed on a side of the speaker device in a state in which the second portion is bent with respect to the first portion.

16. The electronic apparatus according to claim 10, further comprising a printed circuit board including the speaker device mounted on one main surface and the magnetic substrate mounted on another main surface.

17. The electronic apparatus according to claim 10, wherein
the speaker device includes a voice coil that vibrates upon flowing of the electric signal; and
the choke coil and the voice coil are disposed so that a winding axis of the choke coil and a winding axis of the voice coil have arbitrary positional relationship different from parallelism.

18. The electronic apparatus according to claim 10, wherein the magnetic substrate is a multi-layer substrate including a plurality of magnetic layers that are laminated.

* * * * *